United States Patent
Spires et al.

(10) Patent No.: US 7,457,390 B2
(45) Date of Patent: *Nov. 25, 2008

(54) TIMESHARED JITTER ATTENUATOR IN MULTI-CHANNEL MAPPING APPLICATIONS

(75) Inventors: Jeffrey W. Spires, Salt Lake City, UT (US); Ravi Subrahmanyan, Windham, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/541,176

(22) Filed: Sep. 29, 2006

(65) Prior Publication Data
US 2007/0019772 A1 Jan. 25, 2007

Related U.S. Application Data

(63) Continuation-in-part of application No. 11/525,656, filed on Sep. 22, 2006, which is a continuation-in-part of application No. 10/346,550, filed on Jan. 17, 2003, now Pat. No. 7,212,599.

(51) Int. Cl.
*H04L 25/00* (2006.01)
(52) U.S. Cl. ..................................... 375/372
(58) Field of Classification Search ................. 375/372, 375/373; 370/252
See application file for complete search history.

(56) References Cited

U.S. PATENT DOCUMENTS

| 7,212,599 B2* | 5/2007 | Subrahmanyan et al. .... 375/372 |
| 2008/0075125 A1* | 3/2008 | Subrahmanyan et al. .... 370/506 |

\* cited by examiner

*Primary Examiner*—Khai Tran
(74) *Attorney, Agent, or Firm*—Law Office of Gerald Maliszewsk; Gerald Maliszewski

(57) ABSTRACT

A timeshared data tributary mapping system and method are provided for mapping information into Synchronous Payload Envelopes (SPEs). The method buffers data from a plurality of tributaries and stores current buffer-fill information at a rate of about one tributary per Fsys clock cycle. An accumulation of buffer-fill information for the plurality of tributaries is updated with current buffer-fill information every Fsys clock cycle. The accumulation of buffer-fill information for the plurality of tributaries is sampled at a sample rate frequency (Fsample), where Fsample<Fsys. The sampled buffer-fill information is used to calculate a data rate control word for each of the plurality of tributaries, and stuff bit opportunities are serially calculated responsive to the control word. The rate of data being mapped into outgoing tributaries is regulated, and the outgoing mapped tributaries are combined in a SPE.

18 Claims, 4 Drawing Sheets

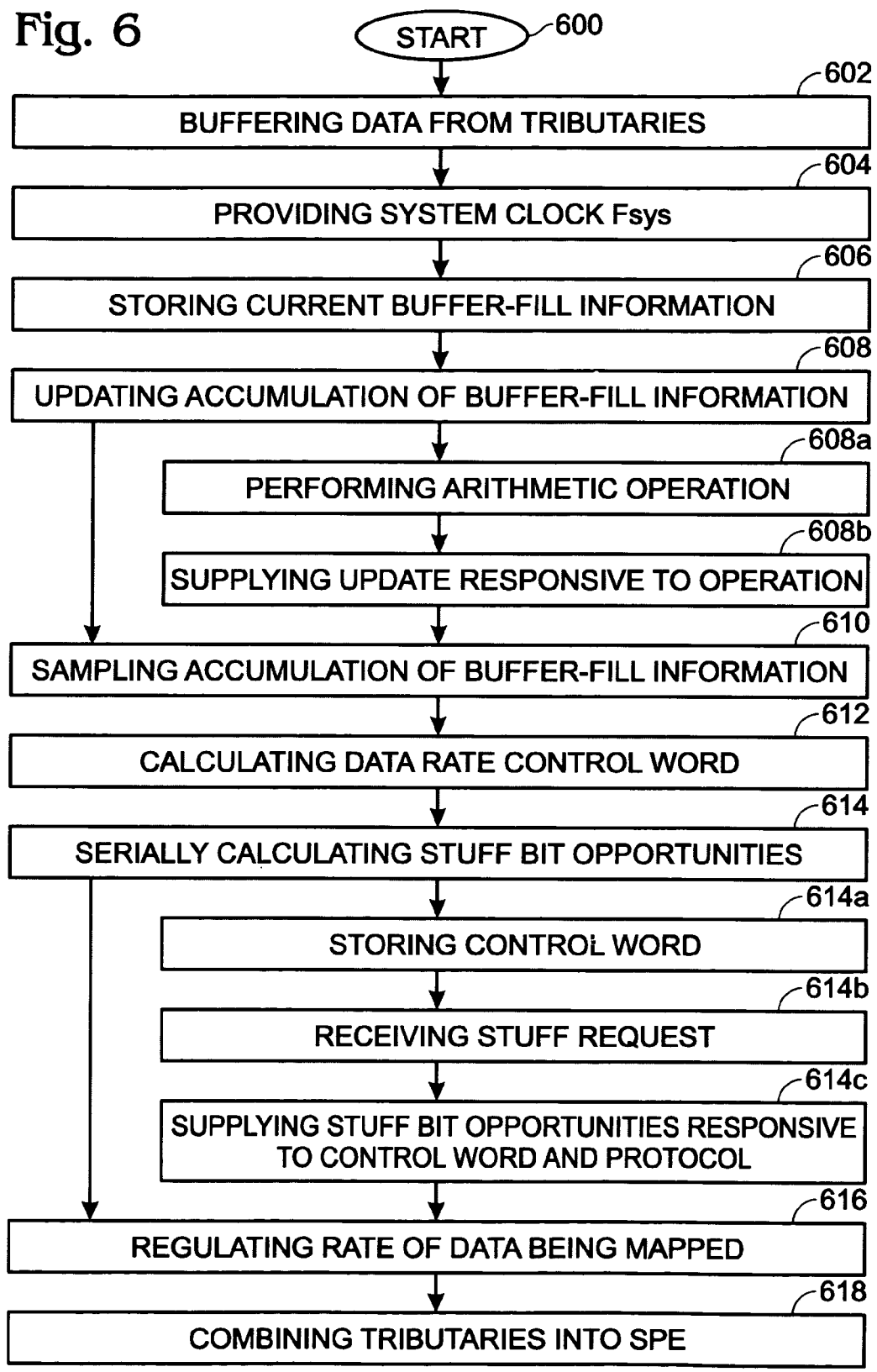

TIMESHARED JITTER ATTENUATOR IN MULTI-CHANNEL MAPPING APPLICATIONS

RELATED APPLICATIONS

This application is a Continuation-in-part of a pending application entitled, SAMPLED ACCUMULATION SYSTEM AND METHOD FOR JITTER ATTENUATION, invented by Subrahmanyan et al, Ser. No. 11/525,656, filed on Sep. 22, 2006, which is incorporated herein by reference.

This application is a Continuation-in-part of a application entitled, JITTER AND WANDER REDUCTION APPARATUS, invented by Subrahmanyan et al., Ser. No. 10/346,550, filed Jan. 17, 2003 now U.S. Pat. No. 7,212,599, which is incorporated herein by reference.

BACKGROUND OF THE INVENTION

1. Field of the Invention

This invention generally relates to digital envelope-framed communications and, more particularly, to a system and method for filtering buffer-fill information that is used in the calculation of stuff bit opportunities for loading data tributaries into a Synchronous Payload Envelope (SPE).

2. Description of the Related Art

In a synchronous communications network, digital payload data is carried at a particular clock frequency within a synchronous message format. This payload data may include both asynchronous digital data and synchronous digital data originating at a different data rate in a foreign digital network. The Synchronous Optical Network (SONET), and its European counterpart the Synchronous Digital Hierarchy (SDH), provide a standard format of transporting digital signals having various data rates, such as a DS-0, DS-1, DS-1C, DS-2, or a DS-3 signal and their European counterparts within a Synchronous Payload Envelope (SPE), or a container that is a part of a SONET/SDH STS-N/STM-N message frame. In addition to the digital data that is mapped and framed within the SPE or container, the STS-N/STM-N message frame also includes overhead data that provides for coordination between various network elements, and permits data delineation.

One of the benefits of SONET is that it can carry large (high-speed) payloads (above 50 Mb/s). However, the existing slower speed digital hierarchy can be accommodated as well, thus protecting investments in current equipment. To achieve this capacity, the STS Synchronous Payload Envelope (SPE) can be sub-divided into smaller components or structures, known as Virtual Tributaries (VT) for the purpose of transporting and switching payloads smaller than the STS-1 rate. All services below the DS3 and E-3 rates are transported in the VT structure.

In SONET there are four sizes of virtual tributaries, a VT-6 (12 columns of data), VT-3 (6 columns of data), VT-2 (4 columns of data), and VT-1.5 (3 columns of data). A virtual tributary group (VTG) is formed of a single type of VT and by definition each VTG contains 12 columns of data. Thus, there can be one (1) VT-6, two (2) VT-3, three (3) VT-2, or 4 VT-1.5 VTs per VTG. Because there are 12 data columns per VTG, there are seven VTGs within a single STS-1 SPE, with a column of data providing the path overhead data and two (2) columns of stuff data. The VGs are grouped within a Virtual Superframe that comprises four (4) consecutive STS-1 message frames. The VTGs within the superframe each have varying numbers of VTs within them, add together define a virtual SPE. The VTs contained within the virtual SPE may be operated in a fixed or floating mode. In a fixed mode, the VT SPE mapping into the four (4) STS-1 SPEs comprising the superframe is fixed. This reduces the interface complexity and is designed for maximum efficiency of the network elements. A floating VT mode allows the VT SPE to float within the virtual SPE defined for the VTs. A floating VT requires a VT payload pointer and VT path overhead. In the case of a VT floating within a virtual superframe, the VT payload pointer is defined by bytes, V1 and V2. In addition, payload resynchronization and payload adjustment is accomplished using the V1, V2, and V3 in the same manner as the H1, H2, and H3 bytes in the transport overhead of the STS-1 message as described below.

Similarly, in a SDH STM-1 format, which is based on a 2.048 Mbit/s hierarchy, there is a bandwidth flexible virtual container (VC) that permits the transmission of high-speed packet switched services, ATM, contribution video, and distribution video. In addition, the VC permits transport and networking at the 2 Mbit/s, 34 Mbit/s, and 140 Mbit/s in addition to the 1.5 Mbit/s hierarchy.

The lowest level of multiplexing in a SDH message includes a single container (C). The containers are used to create a uniform virtual container (VC) payload through bit-stuffing to bring all the inputs to the container to a common bit-rate that is suitable for multiplexing in the VCs. There are two levels of VCs. A low level VC, i.e., VC-11, VC-12, and VC-2, includes data at a rate from 1.5 Mbit/s to 6 Mbits/s. Upper level VCs, i.e., VC-3 and VC-4, include data at a rate of 34/45 Mbit/s and 140 Mbit/s. The various VCs are converted into Transmission Units (TUs) with the addition of tributary pointer information. Thus, a VC-11 becomes a TU-11, a VC-12 becomes a TU-12, a VC-2 becomes a TU-2, and a VC-3 becomes a TU-3.

A single TU-2 or 3 TU-12s, or 4 TU-11s are combined into a Transmission Unit Group 2(TUG-2). Seven TUG-2s can be used to form a VC-3 or a TUG-3. Three TUG-3s are combined to form a VC-4. A single VC-3 or a single VC-4 are converted into an administrative unit three (AU-3) or an AU-4 respectively, with the addition of an administrative unit pointer. Three AU-3s or a single AU-4 are formed into an Administrative Unit Group (AUG). One AU-4, four AU-4s, or 16 AU-4s are formed into an STM-1, STM-4, or an STM-16, respectively. The administrative unit group forms the SPE of the SDH STM-1.

In a floating TU mode, four consecutive 125 microsecond frames of the VC-4 are combined into a single 500 microsecond called a TU multi-frame. The tributary units comprising the TU multi-frame signal also contain payload pointers to allow for flexible and dynamic alignment of the VCs within the TU multi-frame. In this instance, the payload pointer value indicates the offset from the TU to the first byte of the lower order VC. This mechanism allows the AU and TU VC payloads to vary with respect to phase to one another and to the network, while allowing the VCs comprising the AUs and TUs to be synchronously multiplexed. The TU multi-frame overhead consists of four bytes: V1, V2, V3, and V4. Each of the four bytes is located in the first bytes of the respective TU frame in the TU multi-frame signal. The V1 and V2 bytes designate the position of the first byte of the VC, the V3 byte provides a payload pointer adjustment opportunity, and the V4 byte is reserved. Thus each of the VCs within an STM can float relative to one another If the digital data that is mapped and framed in the STS-N/STM-N is originally carried by a clock signal having a different frequency than the SONET/SDH line rate clock, certain adjustments to the framed digital data must be made. For example, if a DS-3 data signal, which is timed by a 44.736 MHz DS-3 clock signal, is to be carried in a SONET/SDH fiber-optic network, the DS3 signal is mapped into the higher rate SPE of an STS-1, and extra bits must be added to the DS-3 signal prior to transmission through the SONET/SDH network. These extra bits are commonly referred to as stuff bits or gap bits, and are place markers and may, or may not carry valid data. These gap bits are required because the DS-3 signal is slower than the SONET/SDH clock frequency, so that there are not enough DS-3 bits at the higher frequency to form a complete SONET frame. More detail may be found in the Bellcore specification "SONET Transport Systems: Common Generic Criteria", GR-253-CORE, Issue 3, September 2000, the Bellcore specification "Transport Systems Generic Requirements (TSGR): Common Requirements", GR-499-CORE, Issue 2, December 1998, and the ITU-T Recommendation G.783, "Characteristics of Synchronous Digital Hierarchy (SDH) Equipment Functional Blocks", January 1994.

When the STS-1 is received at a network exit node, the overhead bytes are removed from the SONET STS-1 and replaced by gaps in the data stream. The payload data that remains is de-framed and de-mapped into a data stream carried at a higher clock frequency than the nominal original clock frequency of the payload data. The stuff data that was inserted when the data was mapped into the SPE remains when the data stream is recovered from the SPE, and is also replaced by gaps in the data stream. Thus, the recovered payload data contains gaps in the data stream remaining after the overhead bytes and stuff data bits have been removed. If, for example, DS-3 data has been transported via a SONET/SDH network, the DS-3 data must be converted from the SONET clock signal to the lower frequency DS-3 clock signal and the gap data bits must be removed prior to the DS-3 signal being B3ZS-encoded for electrical re-transmission.

To transfer data from one clock domain to another, for example from the DS-3 embedded within the SONET signal rate to the proper DS-3 signal rate, a desynchronizer is used to provide a buffering mechanism between the clock domains. A desynchronizer typically includes an elastic store first-in-first-out memory buffer that receives gapped data recovered from a synchronized data payload as an input at one clock frequency and stores the data in appropriate storage locations. The desynchronizer also includes an output mechanism that reads data out of the buffer at a uniform data rate, without the gaps.

Although the SONET/SDH fiber optic network is a synchronous network, variations in clock signals across the network may occur. These variations in clock signals between various network elements may cause a loss of data downstream from the sender if the clock signal at which data is written to the synchronous payload and the clock signal at which the data is read from the synchronous payload are sufficiently different. A variety of conditions can cause variations in clock signals. For example, network clock instability, electrical noise and interference, effective changes in the length of transmission media, changes in the velocity of propagation, Doppler shifts, irregular timing information, and other electrical and network problems may all cause clock variations.

To mitigate the problems caused by clock variations across a network, the SONET/SDH STS-N/STM-N messages are provided with a pointer adjustment mechanism within the transmission overhead bytes that permit some movement of the data within the SPE. The pointer adjustment mechanism includes a pair of bytes, H1 and H2, which identify the start of the next SONET/SDH payload byte and also indicate if the pointer adjustment byte, H3, is to be used. The third overhead byte (H3) provides for active pointer adjustment when a negative justification of the SPE is required. Negative justification involves posting valid data in the H3 byte. Positive justification involves marking the byte after the H3 byte as a dummy or stuff byte. These pointer adjustments allow for eight (8) bits of data to be added to a SONET/SDH message frame (using the H3 overhead byte) or for eight (8) bits to be removed from the frame. This allows for the SPE to be re-framed and re-synched at a network node that has a slightly different network clock. Thus, in addition to the gap data necessary to compensate for payload data that is carried by a different frequency clock signal, eight bits of data may be added or removed at each network element in the network due to clock instability in the network.

Pointer adjustments can be periodic or aperiodic in nature. A periodic pointer adjustment may be caused, for example, when the SPE transporting the data has a constant clock offset at the output node of the network relative to the input node. An aperiodic or non-periodic pointer adjustment may be bursty in nature when caused by a transient problem or condition within the network.

Although the synchronous system may adjust the payload data using pointer adjustments to account for clock and phase variations, the clock and phase shifts caused by the pointer adjustments and/or the de-gapping of the payload data can affect the output rate of the data clock provided by the PLL. Typically, clock and phase shifts have two components. One is a high frequency jitter component that is classified as a clock or phase shift that is greater than, or equal to 10 Hz. A second is a low frequency wander component that is classified as a clock or phase shift that is less than 10 Hz.

Jitter refers to the phase variations in the clock signal, which may cause errors in identifying bit positions and values accurately, and is therefore an issue in synchronous systems. The jitter requirement for SONET can be found in the ANSI document "Synchronous Optical Network (SONET)—Jitter at Network Interfaces", ANSI-T1.105.03-1994. Wander refers to phase variations that typically affect the frame and time-slot synchronization. The wander requirement for SONET can be found in the ANSI document "Synchronous Optical Network (SONET)—Jitter at Network Interfaces—DS3 Wander Supplement", ANSI-T1.105.03b-1997. Each network element adds some amount of noise to the SPE that eventually contributes to the timing instability in the form of jitter and wander in the recovered payload signal.

As is known, the PLL used to recover the smooth clock signal and smooth data signal is able to smooth out some phase jumps caused by pointer adjustments or asynchronous stuff bits. A PLL is most effective at filtering out high frequency jitter components, i.e., those with a frequency greater than 10 Hz, but is less effective at filtering out the low frequency wander components. Since, typically the wander components are much less than 10 Hz, these wander components are well within the bandwidth of the PLL and are passed without being attenuated. To construct a PLL with a small enough bandwidth to filter the wander components of the phase jumps, large time constants in the PLL control loops would require large component values for the resistors and capacitors used in the PLL. In addition, the large time constants required would result in a PLL that is slow to lock onto the reference signal and would cause long delays in recovering lock after a transient event.

One source of wander errors in the output data rate can be caused by the pointer adjustments within the synchronous signals. Each pointer adjustment signal or asynchronous gap data results in a data gap for a given number of clock cycles. For example, an 8-bit pointer adjustment that occurs once a second or less, is a low frequency change in the data rate.

When a pointer adjustment is received however, there are eight bits that are added to the elastic store, or skipped, and not written to the elastic store. The inconsistent nature of the gapped data can result in large changes in the data output rate. The ratio between the input data rate and the output data rate may change by a value sufficiently large that the elastic store can experience a data overflow condition or a data underflow condition. Data overflow occurs when data is written to the elastic store at a faster rate than usual, or read at a slower rate than usual, causing the elastic store to accumulate data. In these conditions, the elastic store may be unable to store all of the incoming data, and data may be lost. Similarly, data underflow occurs when data is written to the elastic store at a slower rate than usual, or read at a faster rate than usual, causing the elastic store to lose data. In this circumstance no data is read from the elastic store.

Typically, the elastic store used in the desynchronizer has a write/read control system that attempts to maintain the output data rate at a specified rate, and maintain the elastic store at a predetermined fill level. If the elastic store begins to overfill, the write/read control system increases the data output rate of the elastic store until the proper storage level in the elastic store is reached. Once the proper storage level is reached, the write/read control system decreases the data output rate. If the elastic store begins to underfill, the write/read control system will decrease the data output rate of the elastic store until the proper storage level in the elastic store is reached. Once the proper level is reached, the write/read control system increases the data output rate.

As noted above, the VT or TU-11/12 pointer bytes V1, V2, and V3 operate in the same manner as the H1, H2, and H3 pointer bytes described herein. Similar problems related to the processing of the VT pointer bytes occur, and the positive justification of the VT pointer bytes is accomplished by assigning the bytes immediately after the V3 bytes as positive stuff opportunity bytes. Negative justification is accomplished by assigning the V3 byte to contain valid data. The frequency and polarity of the pointer adjustments to the VT pointer bytes is uncorrelated to the frequency of the pointer adjustments made by the SONET/SDH H1-H2 -H3 pointer bytes. In addition, the wander and jitter associated with the pointer adjustments is also uncorrelated between the transport overhead pointer bytes and the VT overhead pointer bytes.

The highly non-uniform input data rate to a SONET SPE is primarily due to the presence of transport overhead (TOH) and the position of data bits and stuff bits in the SONET SPE. The TOH data is not provided as output data since the de-mapper in the SONET receiver only provides a write enable signal when valid data from the SPE is present. Thus, there may be long gaps with no data when TOH data is present. As discussed above, stuff bits may be added to the SPE when mapping PDH data into the SONET SPE, to account for different data rates between the PDH data and the SONET data rate. Typically, stuff bits when mapped into the SPE are not valid data and are mapped into known locations. The de-mapper skips over the stuff bits, and a short gap of no data occurs.

A filter and the read enable generator may be used to substantially smooth the non-uniform data input rate. The filter and read enable generator can vary the nominal rate at which read enable signals are generated by controlling stuff opportunities during the data output in which data bits can be added to the nominal data rate, thereby increasing the data rate, or removed from the nominal rate, thereby decreasing the data rate.

The filter and rate enable generator provide an output control word that is indicative of the storage level of tributaries, in preparation for mapping into an SPE. The control word can be the average of the storage level over a predetermined time period, or a value derived from the average or other suitable statistics based on the storage level. For example, the filter may be a low pass filter that averages out fluctuations in the storage level by filtering the high-frequency components to provide the average value, which may be scaled by multiplying it by a predetermined constant, as the control word.

A mapper may be used to map data channels into frames defined by network protocol, where adjacent frames are separated by a frame boundary. For example, PDH tributaries may be mapped into SPEs using SONET protocol.

It would be advantageous if multiple channels of buffer-fill information could be accumulated without parallel sets of filters and stuff rate generators.

SUMMARY OF THE INVENTION

The present invention describes a digital jitter attenuator that uses an input averaging stage to sample incoming buffer-fill information at full rate, and a timeshared filter running at a lower rate arranged to process multiple tributaries within a sampling period. A timeshared stuff rate generator directly controls a mapper. The invention permits an area-efficient high channel count implementation. For example, a full OC-12's worth of jitter attenuation with full transmux (i.e. VT-M13 and vice versa) for both DS1 and E1 signals, in both receive and transmit directions, can be implemented with much fewer gates than a conventional parallel path implementation.

The present invention is built upon an evaluation of the frequencies in the system, including: the system clock rate; the data rates to be supported (DS1 and E1, or DS3 and E3); and, the characteristics of the various mapping formats supported for each of those data rates (e.g. VT1.5 and M13 for DS1, and VT2.0 and G.747 for E1). The present invention uses an averaging process for each channel (tributary). Buffer-fill information is received for each channel at Fsys, and averaged. The shared filter core accepts buffer-fill sampled at the rate Fsample, and stores data rate control words. A stuff rate generator, at a rate independent of Fsample, takes the control words from memory and drives the stuff control bits in the mapper. Fsample is chosen so that the system processes all the channels without falling behind the rate at which the mapper requires stuff control inputs, which is once per superframe in the case of VT1.5, for example. The entire system operates such that the rate recovery for each channel is stable and the filtering is adequate to ensure that the mapping is performed in a manner that satisfies transmission standards. By timesharing the filter block, the present invention is able to reduce the number of gates required.

Accordingly, in a data tributary mapping system, a time-shared method is provided for mapping information into Synchronous Payload Envelopes (SPEs). The method buffers data from a plurality of tributaries and stores current buffer-fill information at a rate of about one tributary per Fsys clock cycle. An accumulation of buffer-fill information for the plurality of tributaries is updated with current buffer-fill information every Fsys clock cycle. The accumulation of buffer-fill information for the plurality of tributaries is sampled at a sample rate frequency (Fsample), where Fsample<Fsys. The sampled buffer-fill information is used to calculate a data rate control word for each of the plurality of tributaries, and stuff bit opportunities are serially calculated responsive to the control word. The rate of data being mapped into outgoing tributaries is regulated, and the outgoing mapped tributaries are combined in a SPE.

Assuming that there are up to n tributaries and that Fsample=Fsys/P, then the accumulation of buffer-fill information for a (one) tributary is sampled every Fsample/n=Fsys/(P·n) clock cycles. Likewise, a control word for a tributary is calculated every Fsample/n clock cycles.

In one aspect, the stuff bit opportunities are serially calculated upon receiving a request for mapping a particular tributary having a defined protocol. Then, the control word, which has previously been stored in memory, is retrieved and stuff bit opportunities are supplied responsive to the tributary's control word and the tributary's protocol.

Additional details of the above-described method and a timeshared system for mapping information into an SPE are provided below.

BRIEF DESCRIPTION OF THE DRAWINGS

FIG. 6 is a flowchart illustrating a timeshared method for mapping information into SPEs, in the context of a data tributary mapping system.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Although the apparatus described herein has application to any synchronous communication system, exemplary aspects of the invention are presented below in the context of a synchronous optical network (SONET) transmitter and mapper.

Figure 1:
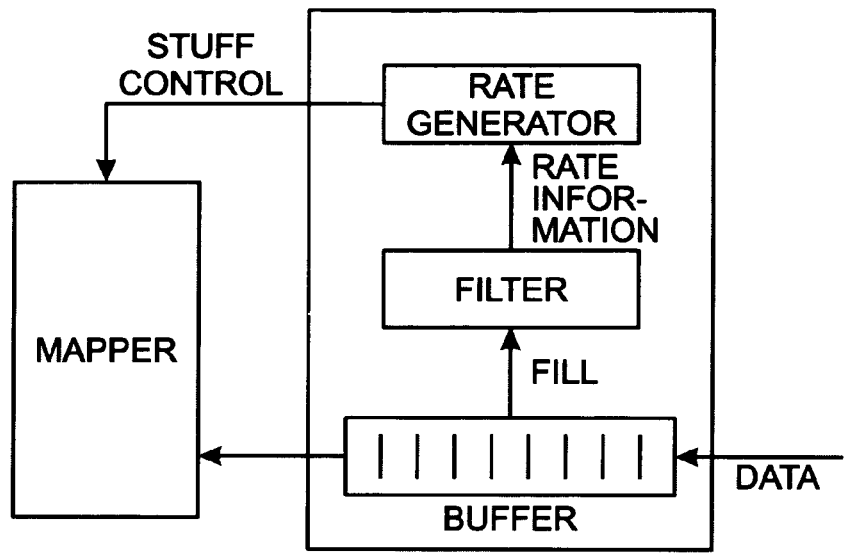
FIG. 1 is a schematic block diagram of a digital jitter attenuator.

FIG. 1 is a schematic block diagram of a digital jitter attenuator. A digital jitter attenuator typically consists of a buffer, a filter, and a rate generator, as shown. The hardware may be replicated for each channel, because each channel needs one buffer. This solution is sufficient for low-density applications, such as 12-28 channels (e.g., 12 DS3s in one STS-12, or 28 DS1s in one STS-1). In this system, buffer-fill information is sent from the buffer to the filter. The filter determines the rate at which the buffer is being filled with data. The rate generator calculates the rate at which the channel must be mapped into an SPE. The rate is manipulated through the use of stuff bit opportunities.

Figure 2:
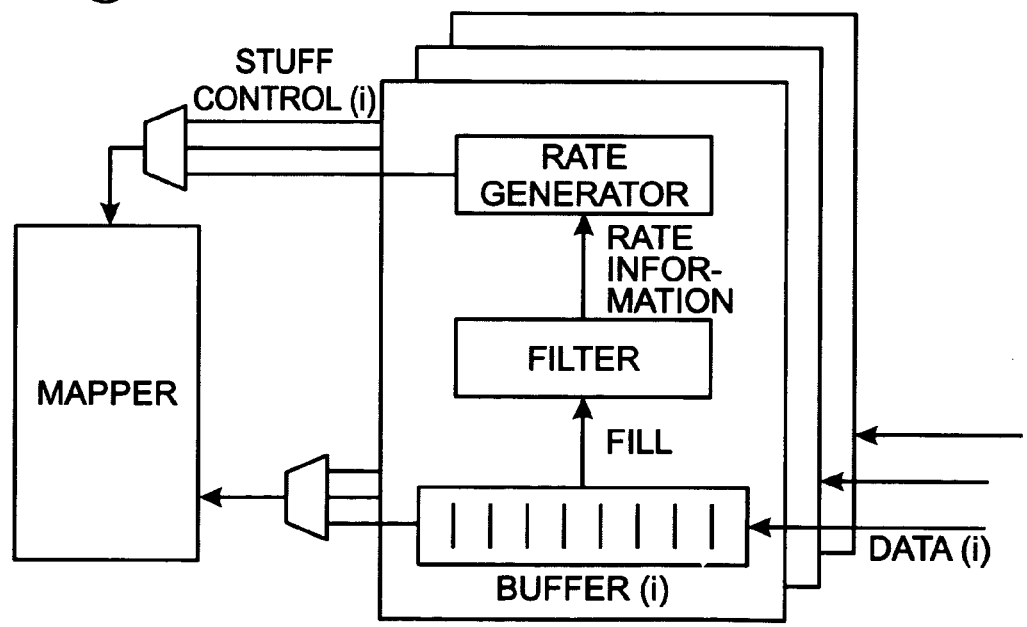
FIG. 2 is a schematic block diagram of a multiple channel jitter attenuator.

FIG. 2 is a schematic block diagram of a multiple channel jitter attenuator. A representative size for a one-channel implementation is 10k gates, so a 12DS3s implementation would be 120k gates in size, and for 28DS1s would be 280k gates in size. As the number of channels increases, the gate count rapidly prohibits a simple replication of parallel channel hardware. For example, a device with STS-12 capacity and support for up to 336 DS1s, would require 3.4M (million) gates for one direction, and to support for bidirectional traffic would require 7M gates.

Figure 3:
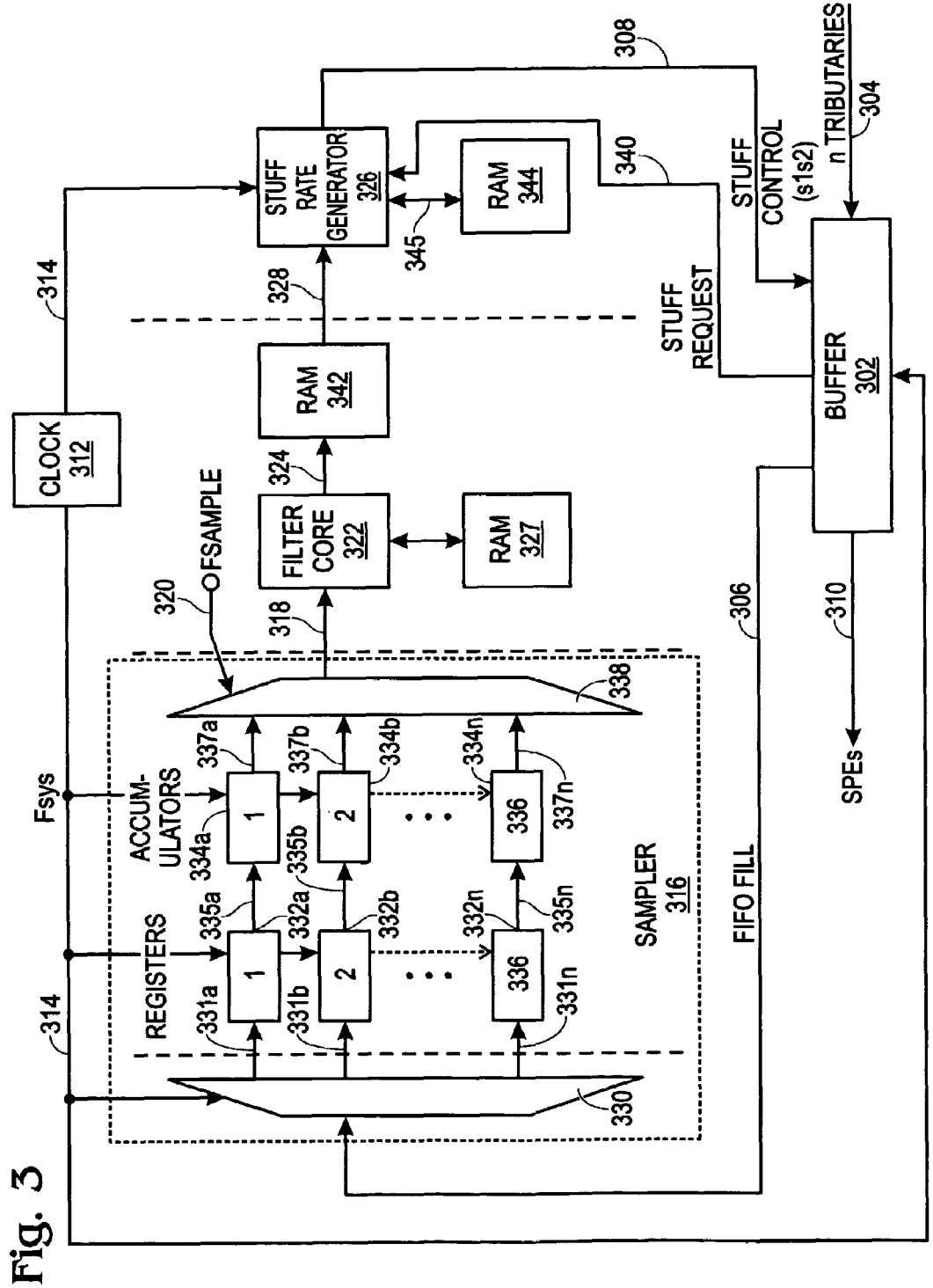
FIG. 3 is a schematic block diagram of a high density timeshared jitter attenuation filter for mapping information into Synchronous Payload Envelopes (SPEs).

FIG. 3 is a schematic block diagram of a high density timeshared jitter attenuation filter for mapping information into Synchronous Payload Envelopes (SPEs). To reduce the gate count, a timeshared channel implementation can be used. The design consists of multiple buffers, one per channel. Data enters and leaves the buffer on a system clock, so the fill of the buffer can change at most each system clock. Therefore, by reading the fill of the buffer every system clock cycle, no information is lost. The buffer-fill information is available at the system clock rate Fsys. Conventionally, buffer-fill information is processed by a filter at a sampling rate Fsample=Fsys. This sampling rate requires one filter block per input. The design of FIG. 3 greatly reduces the amount of hardware needed to process multiple channels, but the multiplexed accumulators must be operated using a sampling rate equal to the system clock Fsys.

More specifically, the timeshared system 300 comprises a buffer 302 having an input on line 304 to accept data from a plurality of tributaries and an output to supply buffer-fill information on line 306. Buffer 302 can be thought of as a combination buffer and mapper. Buffer 302 has an input on line 308 to accept stuff bit opportunities for regulating the rate of data being mapped into outgoing tributaries, and an output on line 310 to supply outgoing mapped tributaries combined in a SPE.

A clock 312 has an output on line 314 to supply a system clock frequency (Fsys). A sampler 316 has an input on line 306 to accept buffer-fill information. The sampler 316 stores current buffer-fill information at a rate of about one tributary per Fsys clock cycle. In one aspect, sampler 316 stores current buffer-fill information at a rate of up to two tributaries per Fsys clock cycle. For example, the buffer-fill information for a first tributary receiving buffered data may change in the same Fsys clock cycle as the buffer-fill information of a second tributary that is mapping data into an SPE. The sampler 316 updates an accumulation of buffer-fill information for the plurality of tributaries, with current buffer-fill information every Fsys clock cycle. The sampler 316 supplies the accumulation of buffer-fill information for the plurality of tributaries at a sample rate frequency (Fsample) at an output on line 318. Here, Fsample is shown as a signal on line 320 that is not necessarily related to Fsys, although Fsample<Fsys. More specifically, the sampler 316 supplies the sampled buffer-fill information for the plurality of tributaries at the rate Fsample=Fsys/P.

A filter 322 has an input on line 318 to accept the sampled buffer-fill information and an output on line 324 to supply a data rate control word calculated for each of the plurality of tributaries. A stuff-bit generator 326 has an input on line 328 to accept control words and an output on line 308 to supply serially calculated stuff bit opportunities responsive to the control word. The filter 322 timeshares the calculation of control words between the plurality of tributaries. In some aspects, intermediate calculations are temporarily stored in memory 327 before delivery on line 324. Generally, the filter 322 determines the width of the data word being buffered for each tributary, and generates control words. The control words are representative of the rate for mapping the buffered tributaries. Ultimately, the rate calculation is used to determine when stuff bits must be used.

The sampler 316 includes a demultiplexer (deMUX) 330 having an input on line 306 for accepting current buffer-fill information for n tributaries. Therefore, deMUX 330 has n outputs. As shown, n in this example is equal to 336. However, it should be understood that the system is not limited to any particular number for n. The sampler 316 has n stages, here represented with the numerals 1, 2, and 336 (T). Each stage is connected to a corresponding deMUX output 331 and includes a register 332 for storing current buffer-fill information. Each stage also includes an accumulator 334 having an input connected to the register on 335 for accepting stored buffer-fill information, and an output on line 337 to supply accumulated buffer-fill information. A multiplexer (MUX) 338 has n inputs for accepting the accumulated buffer-fill information, and an output on line 318 to supply sampled buffer-fill information for a (one) tributary every Fsample/n=Fsys/(P·n) clock cycles. Likewise, the filter 322 calculates a control word for a (one) tributary every Fsample/n clock cycles.

In one aspect, the n accumulators 334 perform at least one arithmetic operation involving the accumulation of buffer-fill information and supply an updated accumulation of buffer-fill information responsive to the arithmetic operations. In this aspect, the accumulator can be thought of as decimators. A decimator, or decimation filter is a device capable of performing processes and arithmetic operations, beyond the accumulating function described above. For example, the decimators may be an FIR or IIR filter. In other aspects, the decimator performs operations involving the current data and previously stored data. Individual decimators may include local memory (not shown), to aid in the processing.

Since the incoming and outgoing "clocks" for the sampler are different, the incoming mapping may deposit a byte into the buffer for any tributary on an Fsys clock, and the outgoing mapping may take a byte out of the buffer for any tributary. For a specific buffer, there may be a byte coming in on any Fsys clock and a byte going out on any Fsys clock. Therefore, the fill can change on any Fsys clock, not only in intervals of n Fsys clock cycles. Note: even though the Fsample clock rate is different that the Fsys rate, the Fsample clock may be carried by (triggered in increments of) Fsys. Also, the outgoing rate of the tributaries in the SPE is generally based on Fsys.

For example, if the incoming and outgoing SONET clocks (which carry the PDH data) for some tributary are the same, but off in phase by one Fsys clock cycle, then the fill of that buffer may change twice in a frame. The fill would change once when a byte comes in, and once when a byte goes out a clock cycle later. In the case where the incoming and outgoing SONET clocks are different, the times when a byte comes in, and when a byte goes out, are not fixed, but "walk" with respect to each other. This difference in rates can create subharmonics of Fsys, as the fill of the buffer goes up and down with changing duty cycles. Worst case, a tributary's fill may change with a resolution on one Fsys clock cycle, and the only way to track it with adequate resolution is to sample each of those fill values.

Thus, in a given Fsys clock cycle, up to 2 tributaries can have their fill change, one from the incoming sequence and one from the outgoing sequence. In a given clock cycle, only one tributary is active on the incoming side and only one tributary is active on the outgoing side. The incoming and outgoing tributaries need not be the same. Therefore, deMUX 330 must be slightly more complex than a conventional deMUX. The deMUX 330 must, in some circumstances, take up to two inputs and send them to the appropriate stages.

More explicitly, the inputs are put into a register for the corresponding tributary, regardless of whether the value has changed or not. So, if the value has changed, the register is updated. If the value has not changed, the register is simply overwritten with the same value. Each accumulator continuously reads that register and accumulates the value within it (whether it has changed or not). The accumulator performs this task for a predetermined number of cycles (P) of Fsys clocks. At the end of the P cycles, it puts the value out to the filter. Therefore, Fsample=Fsys/P, where Fsample is the sampling period of the filter.

The stuff rate generator 326 calculates stuff bit opportunities for a tributary responsive to a tributary mapping protocol. The operation of the stuff rate generator 326 is independent of Fsys and Fsample. Rather, the stuff rate generator 326 is triggered by a mapping or stuff request from the buffer on line 340. More particularly, a memory 342 has an input connected to the filter output on line 324 for storing control words, and an output is connected to the stuff rate generator input on line 328. When the stuff rate generator 326 receives a request from the buffer 302 for mapping one of the n tributaries (e.g., a first tributary), the protocol associated with the first tributary is determined. The stuff rate generator 326 accesses a control word associated with the first tributary from memory 342 and supplies the stuff bit opportunities to the buffer on line 308 responsive to the first tributary control word and the first tributary protocol. Memory 344, on line 345, may be used to store state information for the stuff rate generator.

Although all the elements depicted in FIG. 3 are explained as hardware components, it should be understood that in some aspects all, or part of the element functions can be enabled using a stored set of software instructions, which can be accessed and implemented using a microprocessor.

Functional Description

The system of FIG. 3 may be enabled with multiple buffers (one per channel, 336 in an OC-12 application). The buffers are associated with the mapper, and store the data used by the mapper in mapping the data from each channel into an SPE. Data enters the buffer on the receive, clock, which is the "clock" which carries the incoming PDH data stream. This clock may be different for each tributary, implying a different rate for each tributary. This clock may physically be a system clock Fsys, which is used for all tributaries, and which carries the received data at the rate of the receive clock. This is a typical scenario in the case of a set of PDH signals demapped from a SONET signal that carries multiple tributaries, each at its own rate.

The rate of the system clock, Fsys, is typically higher than the rate of the data streams. Data leaves the buffer on the system clock Fsys, which is the clock on which the mapper assembles the SONET payload and the SONET frame.

In the above scenario, the fill of any buffer can change, at most, each system clock. Therefore, by reading the fill of the buffer every system clock cycle, no information is lost. More explicitly, the buffer-fill information only needs to be updated when the fill changes, but that information is fully captured by reading buffer-fill information every system clock cycle. The fill information is available at the system clock rate Fsys. Conventionally, this fill is processed by a filter that runs at a sampling rate Fsample=Fsys. This conventional design requires one filter block per input (tributary), which is expensive in terms of the number of gates needed for the implementation.

The present invention system is enabled in response to carefully evaluating the frequencies in the system, including: the system clock rate; the data rates to be supported (DS1 and E1, or DS3 and E3); and, the characteristics of the various mapping formats to be supported for each of those data rates (e.g., VT1.5 and M13 for DS1, and VT2.0 and G.747 for E1). The system includes one averager block (stage) per channel (tributary), which takes each fill sample at Fsys and averages over a particular number (P) of Fsys clock cycles to produce a higher precision value at a reduced rate Fsample. A single filter core accepts the higher precision buffer-fill information that has been sampled at the reduced sampling rate Fsample. A stuff rate generator takes the filter output and provides the stuff control bits to the buffer/mapper.

Fsample is chosen such that the system processes all the channels (336, in this example) without falling behind the rate at which the mapper requires stuff control inputs, which for example, is once per superframe in the case of VT1.5. The entire system is operated such that the rate recovery for each channel is stable and the filtering is adequate to ensure that the mapping is performed in a manner that satisfies the standards. By timesharing the filter block, this implementation is able to reduce the number of required gates.

The sampling of the input at each Fsys clock cycle is necessary for wander performance, especially in a transport application in which an incoming PDH stream is demapped (and effectively comes in on its own clock domain) and is then remapped into an outgoing SONET payload carried by Fsys. This demapping/remapping may be done for purposes of monitoring, and/or changing the mapping format, e.g., in the DS1 case from VT1.5 to M13 or vice versa. This processing represents a transfer of clock domain for the PDH signal, but a transfer that occurs without any change in the rate of the signal (i.e., no data are created or lost). Sampling the fill on each Fsys clock cycle allows precise tracking of the signal without loss of resolution which may lead to additional wander in the remapped signal.

Figure 4:
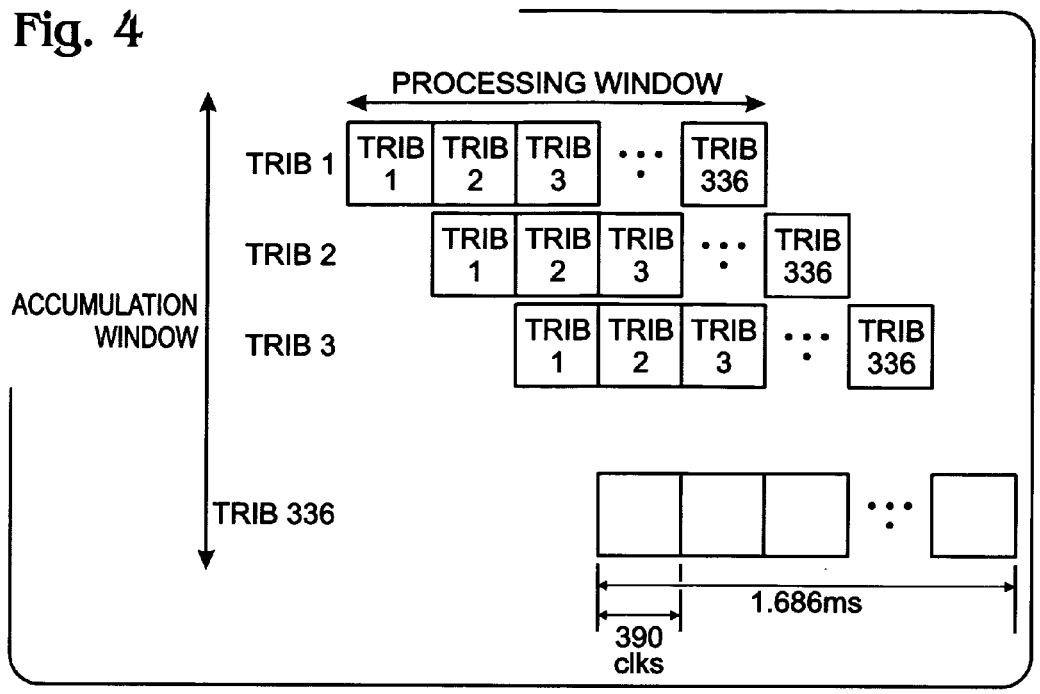
FIG. 4 shows is a diagram depicting the timesharing scheme used between the accumulators and the filter.

FIG. 4 shows is a diagram depicting the timesharing scheme used between the accumulators and the filter. The numbers used in the figure are examples for the case of Fsys=78 megahertz (MHz) and an OC-12 SONET signal with 336 DS1 tributaries. The accumulation window for each tributary is one sampling period of the filter, Fsample. There is an implied timing control circuit that coordinates the activity shown in FIG. 4, between the accumulators, the filter, and stuff rate generator.

The time period corresponding to Fsample represents a certain number of cycles, P, of the system clock Fsys. Therefore, the filter has to come back to processing a particular tributary after P Fsys clock cycles. The number of cycles allocated to the filter for the processing of each tributary is at most P/n, where n is the number of channels (336 in this example). Therefore, each accumulator starts its accumulation cycle staggered by P/n system (Fsys) clock cycles, and produces an output for the filter after P·Fsys clock cycles. The 336 accumulators, therefore, produce 336 results in P Fsys clock cycles, each result staggered by P/n Fsys clock cycles from the previous result (tributary). The filter reads in the output for one tributary, processes it, and stores the result, which is a rate control word, in the output RAM within a maximum of P/n Fsys clock cycles. In this manner, the filter is able to run through all n tributaries within P Fsys clock cycles.

Figure 5:
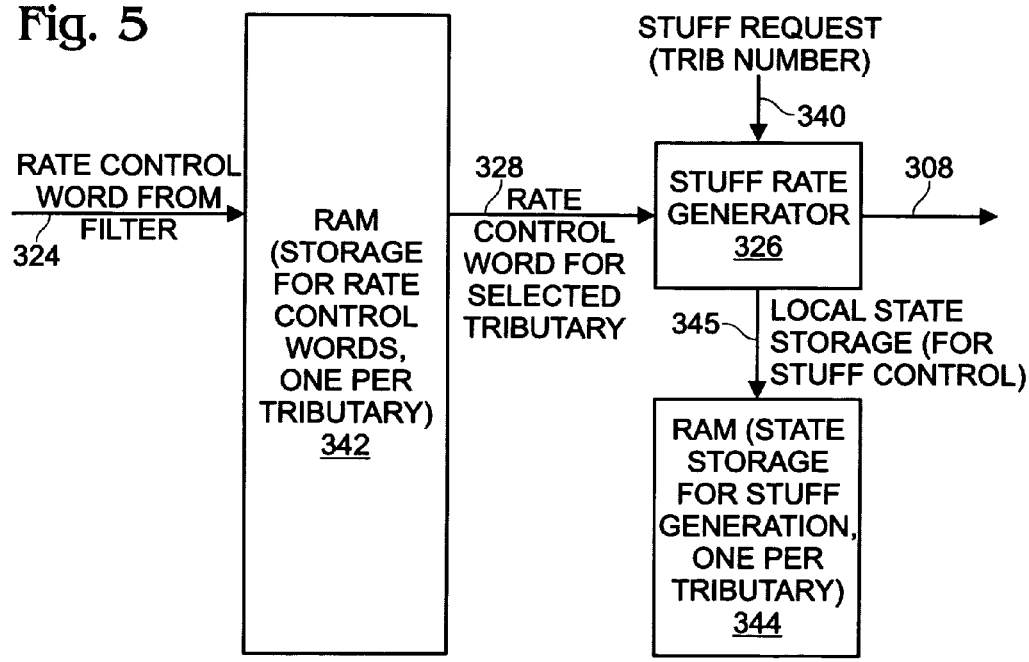
FIG. 5 is a schematic block diagram depicting a pipelined stuff rate generator.

FIG. 5 is a schematic block diagram depicting a pipelined stuff rate generator. Additional details of the algorithm used for stuff generation are presented in a pending application entitled, JITTER AND WANDER REDUCTION APPARATUS, invented by Subrahmanyan et al., Ser. No. 10/346,550, filed Jan. 17, 2003, which is incorporated herein by reference. The stuff rate generator 326 accepts 2 inputs, one input is the rate control word stored by the filter in the RAM 342. The other input is the stuff request on line 340. The stuff request references a tributary number, indicating that stuff indications should be calculated for that tributary. The stuff rate generator runs using the system clock Fsys, and stuff requests may come in each Fsys clock cycle, typically for different tributary numbers. The stuff rate generator produces the stuff indications after a fixed latency of one or more clock cycles. It uses a RAM (344) for local storage of stuff state in-between stuff requests. Note that this scheme is advantageously compatible with the mapping of tributaries into SONET because there is a natural timeslicing in the SONET process. In SONET mapping, only one tributary is processed in each system clock cycle, so only one stuff request needs to be generated in each clock cycle.

The timeshared stuff rate generator calculates the stuff for any tributary upon request. The filter puts its rate control word into the RAM 322 based on Fsample, and independently, the stuff rate generator, as requested, takes that control word and calculates the fill. This decoupling permits the filter calculations to be done independently of the stuff requests, which is important because the stuff requests are tied to the outgoing SONET frame. This system decouples the filter calculations (Fsample), from the outgoing SONET rates.

A rate calculation is performed by the filter, for every tributary, at the Fsample rate, independent of the mapping format. The filter puts out a rate control word. The stuff bit calculation is necessarily based on the rate control word. How often the stuff bits are calculated (the stuff bit rate) is dependent upon the protocol of the tributary. In some protocols, the requests may come for 4000 stuff bit decisions per second. In other protocols, the requests may come approximately 6000 times per second. In both cases, Fsample is the same.

FIG. 6 is a flowchart illustrating a timeshared method for mapping information into SPEs, in the context of a data tributary mapping system. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 600.

Step 602 buffers data from a plurality of tributaries. Step 604 provides a clock with a system clock frequency (Fsys). Step 606 stores current buffer-fill information at a rate of about one tributary per Fsys clock cycle. In one aspect, current buffer-fill information is stored at a rate of up to two tributaries per Fsys clock cycle. Step 608 updates an accumulation of buffer-fill information for the plurality of tributaries, with current buffer-fill information, every Fsys clock cycle. Step 610 samples the accumulation of buffer-fill information for the plurality of tributaries at a sample rate frequency (Fsample), where Fsample<Fsys. Step 612 uses the sampled buffer-fill information to calculate a data rate control word for each of the plurality of tributaries. That is, Step 612 timeshares the calculation of control words between the plurality of tributaries. Step 614 serially calculates stuff bit opportunities responsive to the control word. Step 616 regulates the rate of data being mapped into outgoing tributaries, and Step 618 combines the outgoing mapped tributaries in a SPE.

In one aspect, sampling the accumulation of buffer-fill information in Step 610 includes sampling the plurality of tributaries at the rate Fsample=Fsys/P. When Step 602 accepts up to n tributaries, Step 610 samples the accumulation of buffer-fill information for a tributary every Fsample/n=Fsys/(P·n) clock cycles. Likewise, using the sampled buffer-fill information to calculate the control word in Step 612 includes calculating a control word for a tributary every Fsample/n clock cycles.

In a different aspect, updating the accumulation of buffer-fill information in Step 608 includes substeps. Step 608a performs at least one arithmetic operation involving the accumulation of buffer-fill information. Step 608b supplies an updated accumulation of buffer-fill information responsive to the arithmetic operations.

In another aspect, serially calculating stuff bit opportunities in Step 614 includes calculating stuff bit opportunities for a tributary responsive to a tributary mapping protocol. Step 614a stores the control words. Step 614b receives a (stuff) request for mapping a first tributary having a first protocol, and Step 614c supplies the stuff bit opportunities responsive to a first tributary control word and the first tributary protocol. As noted above, the actual stuff bit opportunities are responsive to the control word, but how often the stuff bit opportunities are provided is a function of the tributary protocol.

A system and method have been provided for mapping information into SPEs using a timesharing filter process. Some exemplary block diagram circuitry and process details have been presented to illustrate the invention. However, the invention is not limited to merely these examples. Other variations and embodiments of the invention will occur to those skilled in the art.

We claim:

1. In a data tributary mapping system, a timeshared method for mapping information into Synchronous Payload Envelopes (SPEs), the method comprising:

buffering data from a plurality of tributaries;
providing a clock with a system clock frequency (Fsys);
storing current buffer-fill information at a rate of about one tributary per Fsys clock cycle;
updating an accumulation of buffer-fill information for the plurality of tributaries with current buffer-fill information, every Fsys clock cycle;
sampling the accumulation of buffer-fill information for the plurality of tributaries at a sample rate frequency (Fsample), where Fsample<Fsys;
using the sampled buffer-fill information to calculate a data rate control word for each of the plurality of tributaries;
serially calculating stuff bit opportunities responsive to the control word;
regulating the rate of data being mapped into outgoing tributaries; and,
combining the outgoing mapped tributaries in a SPE.

2. The method of claim 1 wherein storing current buffer-fill information at the rate of about one tributary per Fsys clock cycle includes storing current buffer-fill information at a rate of up to two tributaries per Fsys clock cycle.

3. The method of claim 1 wherein sampling the accumulation of buffer-fill information includes sampling the plurality of tributaries at the rate Fsample=Fsys/P.

4. The method of claim 1 wherein buffering data from the plurality of tributaries includes accepting up to n tributaries; and,
wherein sampling the accumulation of buffer-fill information includes sampling the accumulation of buffer-fill information for a tributary every Fsample/n=Fsys/(P·n) clock cycles.

5. The method of claim 4 wherein using the sampled buffer-fill information to calculate the control word includes calculating a control word for a tributary every Fsample/n clock cycles.

6. The method of claim 1 wherein updating the accumulation of buffer-fill information includes:
performing at least one arithmetic operation involving the accumulation of buffer-fill information; and,
supplying an updated accumulation of buffer-fill information responsive to the arithmetic operations.

7. The method of claim 1 wherein serially calculating stuff bit opportunities includes calculating stuff bit opportunities for a tributary responsive to a tributary mapping protocol.

8. The method of claim 7 wherein serially calculating stuff bit opportunities includes:
storing the control words;
receiving a request for mapping a first tributary having a first protocol; and,
supplying the stuff bit opportunities responsive to a first tributary control word and the first tributary protocol.

9. The method of claim 1 wherein using the sampled buffer-fill information to calculate the data rate control word includes timesharing the calculation of control words between the plurality of tributaries.

10. A timeshared system for mapping information into Synchronous Payload Envelopes (SPEs), the system comprising:
a buffer having an input to accept data from a plurality of tributaries, an output to supply buffer-fill information, an input to accept stuff bit opportunities for regulating the rate of data being mapped into outgoing tributaries, and an output to supply outgoing mapped tributaries combined in a SPE;
a clock having an output to supply a system clock frequency (Fsys);
a sampler having an input to accept buffer-fill information, the sampler storing current buffer-fill information at a rate of about one tributary per Fsys clock cycle, updating an accumulation of buffer-fill information for the plurality of tributaries with current buffer-fill information, every Fsys clock cycle, and supplying the accumulation of buffer-fill information for the plurality of tributaries at a sample rate frequency (Fsample) at an output, where Fsample<Fsys;

a filter having an input to accept the sampled buffer-fill information and an output to supply a data rate control word calculated for each of the plurality of tributaries; and, a stuff-bit generator having an input to accept control words and an output to supply serially calculated stuff bit opportunities responsive to the control word.

11. The system of claim 10 wherein the sampler stores current buffer-fill information at a rate of up to two tributaries per Fsys clock cycle.

12. The system of claim 10 wherein the sampler supplies the sampled buffer-fill information for the plurality of tributaries at the rate Fsample=Fsys/P.

13. The system of claim 10 wherein the sampler includes:
a demultiplexer (deMUX) having an input for accepting current buffer-fill information for n tributaries, and having n outputs;
n stages, each stage connected to a corresponding deMUX output and including a register for storing current buffer-fill information, an accumulator having an input connected to the register for accepting stored buffer-fill information, and an output to supply accumulated buffer-fill information; and,
a multiplexer (MUX) having n inputs for accepting the accumulated buffer-fill information, and an output to supply sampled buffer-fill information for a tributary every Fsample/n=Fsys/(P·n) clock cycles.

14. The system of claim 13 wherein the filter calculates a control word for a tributary every Fsample/n clock cycles.

15. The system of claim 13 wherein the n accumulators perform at least one arithmetic operation involving the accumulation of buffer-fill information and supply an updated accumulation of buffer-fill information responsive to the arithmetic operations.

16. The system of claim 10 wherein the stuff rate generator calculates stuff bit opportunities for a tributary responsive to a tributary mapping protocol.

17. The system of claim 16 further comprising:
a memory having an input connected to the filter output for storing control words, and an output connected to the stuff rate generator input; and,
wherein the stuff rate generator receives a request from the buffer for mapping a first tributary having a first protocol, the stuff rate generator accessing a first tributary control word from memory and supplying the stuff bit opportunities to the buffer responsive to the first tributary control word and the first tributary protocol.

18. The system of claim 10 wherein the filter timeshares the calculation of control words between the plurality of tributaries.

* * * * *